United States Patent
Iwase

(10) Patent No.: US 10,377,113 B2
(45) Date of Patent: Aug. 13, 2019

(54) FUNCTIONAL LAMINATED FILM

(71) Applicant: FUJIFILM Corporation, Tokyo (JP)

(72) Inventor: Eijiro Iwase, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 165 days.

(21) Appl. No.: 15/584,431

(22) Filed: May 2, 2017

(65) Prior Publication Data

US 2017/0232718 A1 Aug. 17, 2017

Related U.S. Application Data

(63) Continuation of application No. PCT/JP2015/079319, filed on Oct. 16, 2015.

(30) Foreign Application Priority Data

Nov. 14, 2014 (JP) ................................. 2014-231799

(51) Int. Cl.
| | | |
|---|---|---|
| *B32B 27/18* | (2006.01) | |
| *B32B 27/00* | (2006.01) | |
| *B32B 9/00* | (2006.01) | |
| *B32B 7/02* | (2019.01) | |
| *B82Y 30/00* | (2011.01) | |
| *F21V 9/30* | (2018.01) | |
| *B29D 11/00* | (2006.01) | |
| *B32B 7/04* | (2019.01) | |
| *B32B 27/08* | (2006.01) | |
| *B32B 27/28* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *G02F 1/13357* | (2006.01) | |
| *G02F 1/1335* | (2006.01) | |

(52) U.S. Cl.
CPC .......... *B32B 27/18* (2013.01); *B29D 11/0073* (2013.01); *B29D 11/00788* (2013.01); *B32B 7/02* (2013.01); *B32B 7/04* (2013.01); *B32B 9/00* (2013.01); *B32B 27/00* (2013.01); *B32B 27/08* (2013.01); *B32B 27/281* (2013.01); *B32B 27/302* (2013.01); *B32B 27/304* (2013.01); *B32B 27/306* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *B82Y 30/00* (2013.01); *F21V 9/30* (2018.02); *B32B 2250/02* (2013.01); *B32B 2250/24* (2013.01); *B32B 2255/10* (2013.01); *B32B 2255/20* (2013.01); *B32B 2255/26* (2013.01); *B32B 2255/28* (2013.01); *B32B 2307/40* (2013.01); *B32B 2307/412* (2013.01); *B32B 2307/42* (2013.01); *B32B 2307/422* (2013.01); *B32B 2307/546* (2013.01); *B32B 2307/728* (2013.01); *B32B 2307/7242* (2013.01); *B32B 2307/7244* (2013.01); *B32B 2307/7246* (2013.01); *B32B 2307/732* (2013.01); *B32B 2457/202* (2013.01); *G02F 1/1336* (2013.01); *G02F 2001/133614* (2013.01); *G02F 2201/501* (2013.01); *G02F 2202/022* (2013.01); *G02F 2202/36* (2013.01)

(58) Field of Classification Search
None
See application file for complete search history.

(56) References Cited

U.S. PATENT DOCUMENTS

| | | | | |
|---|---|---|---|---|
| 2007/0231592 | A1* | 10/2007 | Agata | ........................ C08J 7/045 428/522 |
| 2009/0196997 | A1* | 8/2009 | Nakagame | ............... B05D 1/28 427/294 |
| 2016/0195229 | A1 | 7/2016 | Tokinoya | |
| 2017/0017118 | A1 | 1/2017 | Yonemoto et al. | |
| 2017/0096538 | A1 | 4/2017 | Sasaki et al. | |

FOREIGN PATENT DOCUMENTS

| | | |
|---|---|---|
| JP | 2007-290369 A | 11/2007 |
| JP | 2013-544018 A | 12/2013 |
| JP | 2015-065158 A | 4/2015 |
| WO | 2012/064562 A1 | 5/2012 |
| WO | 2014006597 A1 | 1/2014 |
| WO | 2015/037733 A1 | 3/2015 |
| WO | 2015/141226 A1 | 9/2015 |
| WO | 2015/147287 A1 | 10/2015 |

OTHER PUBLICATIONS

Notification of Reasons for Refusal issued by the Japanese Patent Office on May 8, 2018 in connection with Japanese Patent Application No. 2014-231799.

(Continued)

*Primary Examiner* — Sheeba Ahmed
(74) *Attorney, Agent, or Firm* — Edwards Neils, LLC; Jean C. Edwards, Esq.

(57) ABSTRACT

Provided is a functional laminated film having a functional layer formed by dispersing functional materials in a binder, in which the functional laminated film can inhibit generation of bubbles in the functional layer, and can prevent the functional material from being deteriorated by water or oxygen. The functional layer is formed by dispersing functional materials in a binder, and the binder is formed by polymerizing monomers. The monomers include 50% by mass or more of monomers X having a molecular weight of 100 to 1,500 with respect to the total mass of the monomers, and the gas barrier performance of a gas barrier film is 0.005 [$g/(m^2 \cdot day)$] to 0.8 [$g/(m^2 \cdot day)$].

20 Claims, 1 Drawing Sheet

(56) References Cited

OTHER PUBLICATIONS

Office Action issued by Chinese Patent Office dated Jul. 12, 2018, in connection with Chinese Patent Application No. 201580061234.X.
International Search Report issued in PCT/JP2015/079319 dated Dec. 15, 2015.
Written Opinion issued in PCT/JP2015/079319 dated Dec. 15, 2015.
International Preliminary Report on Patentability and Written Opinion issued by WIPO dated May 26, 2017, in connection with international Patent Application No. PCT/JP2015/079319.

* cited by examiner

FUNCTIONAL LAMINATED FILM

CROSS-REFERENCE TO RELATED APPLICATIONS

This application is a Continuation of PCT International Application No. PCT/JP2015/079319 filed on Oct. 16, 2015, which was published under PCT Article 21(2) in Japanese, and which claims priority under 35 U.S.C. § 119(a) to Japanese Patent Application No. 2014-231799 filed on Nov. 14, 2014. The above applications are hereby expressly incorporated by reference, in their entirety, into the present application.

BACKGROUND OF THE INVENTION

1. Field of the Invention

The present invention relates to a functional laminated film.

2. Description of the Related Art

Applications of a liquid crystal display device (hereinafter also referred to as an LCD) as a low power-consumption and space-saving image display device have been enlarged year by year. Further, in recent liquid crystal display devices, there have been demands for further power saving, enhancement in color reproducibility, and the like to improve LCD performance.

It has been proposed to use quantum dots which emit by conversion of a wavelength of incidence ray in order to increase light utilization efficiency and enhance color reproducibility as power saving of the backlight in an LCD is further developed.

Quantum dots are a state of electrons having a restriction in moving directions in all three-dimensional directions, and in a case where nanoparticles of a semiconductor are three-dimensionally surrounded by high-potential barriers, these nanoparticles form quantum dots. The quantum dots express various quantum effects. For example, a "quantum size effect" in which the state densities (energy levels) of the electrons are discretized is expressed. Through the quantum size effect, the absorption wavelength—the emission wavelength of the light can be controlled by changing the sizes of the quantum dots.

Generally, such quantum dots are dispersed in a binder such as a resin, which is used as a quantum dot film for performing the wavelength conversion of light, for example, after being disposed between a backlight and a liquid crystal panel.

When excitation light is incident to a film including quantum dots from a backlight, the quantum dots are excited to emit fluorescent light. Here, white light can be realized by emitting light having a narrow half width, such as red light, green light, and blue light, by employing quantum dots having different light emission characteristics. Since the fluorescent light derived from quantum dots has a narrow half width, it is possible to make a design such that the white light obtained by appropriately selecting the wavelength can be designed to have a high luminance or excellent color reproducibility.

However, the quantum dots have problems in that they are easily deteriorated by moisture or oxygen and the light emission intensity is reduced by a photo-oxidation reaction. Therefore, protection of a quantum dot layer has been carried out by laminating a gas barrier film on both surfaces of a resin layer including quantum dots (hereinafter also referred to as a "quantum dot layer").

For example, JP2013-544018A describes a display backlight unit provided with a remote phosphor film including a light emitting quantum dot (QD) group, and also describes a configuration in which a QD phosphor material is sandwiched between two gas barrier films. Further, as a material for forming the barrier layer of a gas barrier film, oxides such as silicon oxide, titanium oxide, and aluminum oxide are described.

SUMMARY OF THE INVENTION

The present inventors have found that in the functional laminated film as described above, when a quantum dot layer is sandwiched between the gas barrier films, failures involving generation of bubbles in the quantum dot layer occur in some cases.

According to the investigations conducted by the present inventors, it has been found that these bubbles are caused by gases from the evaporation of monomers which form a binder for the quantum dot layer, or decomposed products thereof, or a polymerization initiator for use in the polymerization thereof or unreacted residues thereof, and the bubbles are generated since the evaporants are not discharged to the outside by being sandwiched between the gas barrier films, resulting in generation of the bubbles, in some cases. The reason therefor is considered to be that an energy source which causes such the evaporation is inevitable as in heat generated at a time of laminating gas barrier films onto a quantum dot layer, and heat from such the light source at a time of use after it being introduced into a backlight as a product. In such cases, it is difficult to inhibit bubbles from being generated by reducing the energy source of evaporation.

That is, in the related art, it has been considered to protect a quantum dot layer by sandwiching it between gas barrier films in order to prevent the quantum dot layer from being deteriorated due to water or oxygen, but the present inventors have found that when a gas barrier film having high gas barrier performance is used, bubbles are generated in the quantum dot layer, resulting in defects, in some cases.

As a method for suppressing such bubbles, it is considered to use a material which is difficult to be decomposed as a binder of a quantum dot layer, but in a case of a quantum dot layer having some thickness, monomers which form a base of the binder or a part of a photopolymerization initiator remain unreacted, and as a result, these evaporate, thereby generating bubbles.

Alternatively, it is also considered to select a material having higher curability, which however poses problems such as deterioration of coatability and deformation of a film due to volume shrinkage during the curing as a binder.

Furthermore, it is also considered to use a polymer material which is difficult to evaporate as a material of a binder, but there occurs a problem in that it is difficult to suitably disperse quantum dot materials, or in that since it is difficult to perform UV curing, adhesiveness to a gas barrier film is not secured, leading to peeling off.

As described above, there have been some cases where the problem of generation of bubbles in the quantum dot layer cannot be solved only by selection of a binder material of a quantum dot layer.

The present invention aims to solve the above-described problems in the related art, and has an object to provide a functional laminated film formed by sandwiching a functional layer formed by dispersing functional materials in a binder between gas barrier films, in which the functional laminated film can inhibit bubbles from being generated in the functional layer, and can prevent the functional material from being deteriorated by water or oxygen.

The present inventors have conducted extensive investigations so as to achieve the objects, and as a result, they have found that when a functional layer is formed by dispersing functional materials in a binder, this binder is formed by the polymerization of monomers including a predetermined amount of monomers X having a molecular weight of 100 to 1,500, the gas barrier performance of the gas barrier film is set to 0.005 [g/(m²·day)] to 0.8 [g/(m²·day)], it is possible to inhibit bubbles from being generated in the functional layer and prevent the functional material from being deteriorated by water or oxygen, thereby completing the present invention.

That is, the present invention provides functional laminated films having the following configurations.

(1) A functional laminated film formed by sandwiching a functional layer between gas barrier films, in which the functional layer is formed by dispersing functional materials in a binder, the binder is formed by the polymerization of monomers, the monomers include 50% by mass or more of monomers X having a molecular weight of 100 to 1,500 with respect to the total mass of the monomers, and the water vapor permeability of the gas barrier film is 0.005 [g/(m²·day)] to 0.8 [g/(m²·day)].

(2) The functional laminated film as described in (1), in which the water vapor permeability of the functional laminated film is 0.0025 [g/(m²·day)] to 0.4 [g/(m²·day)].

(3) The functional laminated film as described in (1) or (2), in which the boiling point of the monomer X is 160° C. to 250° C.

(4) The functional laminated film as described in any one of (1) to (3), in which the thermogravimetric reduction rate of the monomer X is 2% by mass or less at 100° C.

(5) The functional laminated film as described in any one of (1) to (4), in which the monomer X has a (meth)acryloyl group.

(6) The functional laminated film as described in (5), in which the monomer X has one (meth)acryloyl group.

(7) The functional laminated film as described in any one of (1) to (6), in which the monomers X include monomers having 2 to 4 (meth)acryloyl groups.

(8) The functional laminated film as described in any one of (1) to (7), in which the binder is formed by the polymerization of monomers in the presence of a photopolymerization initiator.

(9) The functional laminated film as described in any one of (1) to (8), in which the gas barrier film has a gas barrier support and a gas barrier layer, and the gas barrier layer is disposed to be in contact with the functional layer.

(10) The functional laminated film as described in any one of (1) to (9), in which the gas barrier layer has a film formed of any one of aluminum oxide, silicon oxide, and silicon nitride.

(11) The functional laminated film as described in any one of (1) to (10), in which the functional layer is a light wavelength conversion layer including quantum dots as a functional material.

According to the present invention as described above, it is possible to provide a functional laminated film that inhibits bubbles from being generated in the functional layer, and prevents the functional material from being deteriorated by water or oxygen.

DESCRIPTION OF THE PREFERRED EMBODIMENTS

Hereinbelow, the functional laminated film of the present invention will be described in detail, with reference to suitable embodiments shown in the accompanying drawings.

The descriptions on the constituent factors described below are based on representative embodiments of the present invention, but the present invention is not intended to be limited to such embodiments.

Furthermore, in the present specification, a numerical range expressed using "to" means a range that includes the preceding and succeeding numerical values of "to" as the lower limit value and the upper limit value, respectively.

The functional laminated film of the present invention is a functional laminated film formed by sandwiching a functional layer formed by dispersing functional materials in a binder between gas barrier films, in which the binder is formed by the polymerization of monomers, the monomers include 50% by mass or more of monomers X having a molecular weight of 100 to 1.500 with respect to the total mass of the monomers, and the water vapor permeability of the gas barrier film is 0.005 [g/(m²·day)] to 0.8 [g/(m²·day)].

For the functional laminated film of the present invention, a binder formed by the polymerization of monomers including a predetermined amount of monomers X having a molecular weight of 100 to 1,500 is used, and by setting the water vapor permeability of the gas barrier film to a range of 0.005 [g/(m²·day)] to 0.8 [g/(m²·day)], the functional layer can be protected from external water or oxygen while the evaporating binder material is discharged to the outside of the gas barrier film.

That is, the present invention aims to further improve the quality of a functional layer as a functional laminated film by achieving appropriate volatility of the binder material and the barrier performance of the gas barrier film to suppress the generation of bubbles due to an evaporating binder material and protect the functional layer from water or oxygen.

Next, the configuration of the functional laminated film of the present invention will be described with reference to FIG. 1A.

Figure 1A:
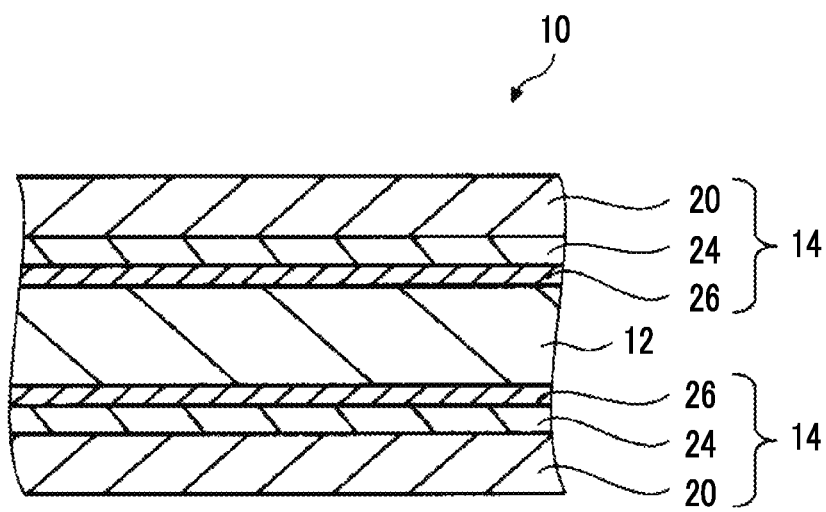
FIG. 1A is a cross-sectional view that conceptually shows one example of a functional laminated film of the present invention.

FIG. 1A is a cross-sectional view that conceptually shows one example of the functional laminated film of the present invention.

A functional laminated film 10 shown in FIG. 1A has a functional layer 12 and two gas barrier films 14, each laminated on both the main surfaces of the functional layer 12.

The functional layer 12 is a layer for expressing desired functions such as wavelength conversion.

By way of an example, the functional layer 12 is a quantum dot layer formed by dispersing a number of quantum dots in a binder (matrix) such as a resin, and also a light wavelength conversion layer having a function that converts the wavelength of the light incident on the functional layer 12 to emit the light.

For example, when blue light emitted from a backlight not shown is incident on the functional layer 12, the functional layer 12 coverts the wavelength of at least a part of the blue light into red light or green light by the effect of the quantum dot contained inside to emit the light.

Here, the blue light is light having a central light emission wavelength in a wavelength range of 400 nm to 500 nm, the green light is light having a central light emission wavelength in a wavelength range of 500 nm to 600 nm, and the red light is light having a central light emission wavelength in a wavelength range of more than 600 nm to 680 nm or less.

In addition, the function of the wavelength conversion expressed by the quantum dot layer is not limited to a configuration for the wavelength conversion from blue light to red light or green light, and may be any of functions in which at least a part of incidence ray is converted into light having a different wavelength.

The quantum dot is at least excited by incident excitation light to emit fluorescent light.

The type of the quantum dot contained in the quantum dot layer is not particularly limited, and according to desired performance of wavelength conversion, and the like, various known quantum dots may be appropriately selected.

For the quantum dot, reference can be made to, for example, paragraphs 0060 to 0066 of JP2012-169271A, but the quantum dot is not limited thereto. As the quantum dot, a commercialized product can be used without any limitation. The emission wavelength of the quantum dot can be usually adjusted by the composition and the size of a particle.

The quantum dots are preferably uniformly dispersed in a binder, and may also be unevenly dispersed in the binder.

In addition, the quantum dots may be used singly or in combination of two or more kinds thereof.

In a case of using the quantum dots in combination of two or more kinds thereof, two or more kinds of the quantum dots having different wavelengths of light to be emitted may also be used.

Examples of a known quantum dot include a quantum dot (A) having a center light-emission wavelength in the wavelength range in a range of 600 nm to 680 nm, a quantum dot (B) having a center light-emission wavelength in the wavelength range in a range of 500 nm to 600 nm, and a quantum dot (C) having a center light-emission wavelength in the wavelength range in a range of 400 nm to 500 nm, and the quantum dot (A) is excited by excitation light to emit red light, the quantum dot (B) is excited by excitation light to emit green light and the quantum dot (C) is excited by excitation light to emit blue light. For example, when blue light is incident as excitation light on a quantum dot layer including the quantum dot (A) and the quantum dot (B), red light emitted from the quantum dot (A), green light emitted from the quantum dot (B) and blue light penetrating through the quantum dot layer can realize white light. Alternatively, ultraviolet light can be incident as excitation light on a quantum dot layer including the quantum dots (A), (B) and (C), thereby making it possible to realize white light with red light emitted from the quantum dot (A), green light emitted from the quantum dot (B) and blue light emitted from the quantum dot (C).

Moreover, as the quantum dot, a so-called quantum rod which emits polarized light with directivity in a rod shape may also be used.

The binder of the functional layer 12 is intended to disperse a number of quantum dots which are functional materials to hold the layer.

Here, in the present invention, the binder of the functional layer 12 is formed by polymerization of the monomers, and 50% by mass or more of the monomers are monomers X having a molecular weight of 100 to 1,500.

Furthermore, in the present invention, the monomers (monomers X) mean polymerizable compounds (compounds having a polymerizable group), are not limited to the monomers, and may also include two or more of repeating units which may be the same or different from each other.

Incidentally, the molecular weight refers to a weight-average molecular weight with respect to multimers. The weight-average molecular weight refers to a weight-average molecular weight determined by converting a value measured by gel permeation chromatography (GPC) in terms of polystyrene. The measurement conditions by GPC can employ, for example, the following conditions.

GPC device: HLC-8120 (manufactured by Tosoh Corporation)

Column: TSK gel Multipore HXL-M (manufactured by Tosoh Corporation, 7.8 mm ID (inner diameter)×30.0 cm)

Eluent: Tetrahydrofuran (THF)

As described above, a configuration in which a functional layer formed by dispersing functional materials such as quantum dots in a binder is sandwiched between gas barrier films in order to protect the functional layer from water or oxygen has been proposed.

In such a functional laminated film, by heat at a time of adhering a gas barrier film to a functional layer, using the gas barrier film as a product after introducing it into backlight, or the like, monomers which form a binder of the functional layer or decomposed products thereof, or a polymerization initiator for use in the polymerization or unreacted residues thereof evaporate. However, it could be seen that when the functional layer is sandwiched between gas barrier films having superior gas barrier performance, the evaporating materials are not discharged to the outside, and thus, bubbles are generated in the functional layer in some cases. These bubbles are perceived as point defects such as white points in some cases.

As a method of suppressing such bubbles, it is considered that a material which is difficult to be decomposed is used as a binder. However, in general, since the functional layer formed by dispersing functional materials in a binder is formed to be thick by increasing the proportion of the binder so as to make the functional materials be uniformly dispersed and express appropriate functions, some of the monomers which form a base of the binder and the photopolymerization initiator remain unreacted, and therefore, they evaporate, leading to generation of bubbles in some cases.

Alternatively, it is also considered that a material having an even higher curability is selected as the binder, but problems such as deterioration of coatability and deformation of a film due to volume shrinkage during curing occur in some cases.

In addition, it is also considered to use a polymer material which is difficult to evaporate as a material of the binder, but there occurs a problem in that it is difficult to suitably disperse functional materials, or in that since it is difficult to perform UV curing, adhesiveness to a gas barrier film is not secured, leading to peeling off.

In contrast, in the functional laminated film of the present invention, the binder of the functional layer 12 is formed by the polymerization of monomers including a predetermined amount of monomers X having a molecular weight of 100 to 1,500, and the water vapor permeability of the gas barrier film 14 is 0.005 [g/(m²·day)] to 0.8 [g/(m²·day)].

As a result, the viscosity of the coating composition for forming a functional layer is lowered, and thus, the coatability can be improved. Further, the functional materials can be appropriately dispersed in the binder, and the volume shrinkage during the curing can be reduced, and thus, the adhesiveness to the gas barrier film can be secured. Further, the relationship between the volatility of the binder material and the barrier performance of the gas barrier film can be adjusted to be appropriate, and thus, the functional layer can be protected from external water or oxygen while the evaporating binder material is discharged to the outside of the gas barrier film, whereby the quality of the functional layer as a functional laminated film can be further improved.

That is, in a case where the amount of monomers having a molecular weight of less than 100 to be used is too high, the coatability or the like is improved, but the volatility of the monomers becomes too high, and thus, the amount of the binder materials to evaporate increases. Therefore, in order to discharge the binder materials that have evaporated sufficiently to the outside, it is necessary to further lower the gas barrier performance of the gas barrier film (to further enhance the water vapor permeability). However, when the gas barrier performance of the gas barrier film is further lowered, the functional layer cannot be sufficiently protected from external water or oxygen in some cases.

On the other hand, in a case where the amount of the monomers having a molecular weight of more than 1,500 is too high, the binder materials are difficult to evaporate, but there occur problems, for example, in that it is difficult to suitably disperse functional materials, or in that since it is difficult to perform UV curing, adhesiveness to a gas barrier film is not secured, leading to peeling off, in some cases.

Accordingly, in the present invention, monomers X having a molecular weight of 100 to 1,500 are used as a main monomer out of the monomers.

Hereinafter, the monomers X will be first described in detail, and thereafter, the monomers will be described in detail. Further, the gas barrier film 14 will be described later.

The molecular weight of the monomer X is 100 to 1,500, and from the above-described viewpoint, the molecular weight is preferably 120 to 1,000, and more preferably 150 to 700.

A method for measuring the molecular weight is as described above.

Furthermore, the content of the monomers X in the monomers is 50% by mass or more with respect to the total mass of the monomers. That is, the monomers X having a molecular weight of 100 to 1,500 have the monomers of the binder materials as a main component. Within this range, the volatility of the binder material, the coatability or the like can be adjusted to be appropriate. From these viewpoints, the content of the monomers X is preferably 70% by mass or more, and more preferably 90% by mass or more.

Moreover, the boiling point (at 1 atm) of the monomer X is not particularly limited, but is preferably 160° C. to 250° C. It is preferable to set the boiling point of the monomer X to 160° C. to 250° C. from the viewpoint that the volatility of the binder material can be suppressed, for example.

Furthermore, the thermogravimetric reduction rate of the monomer X is not particularly limited, but is preferably 2% by mass or less at 100° C., and more preferably 0.1% by mass to 2% by mass.

It is preferable to set the thermogravimetric reduction rate of the monomer X to the range, from the viewpoints that the volatility of the binder material can be suppressed, the monomers are diffused on the barrier surface of the gas barrier film, adhesion strength can be obtained, for example.

In addition, the thermogravimetric reduction rate was measured under the conditions of a measurement environment of an $N_2$ purge (250 mL/min) and a temperature raising rate of 5° C./min, using a thermogravimetric measurement device (manufactured by Hitachi High-Tech Science Corporation STA7200).

The monomer X includes a polymerizable group, but the kind of the polymerizable group is not particularly limited, but known polymerizable groups can be employed. Examples thereof include a radically polymerizable group, a cationically polymerizable group, and an anionically polymerizable group. Examples of the radically polymerizable group include a (meth)acryloyl group, a vinyl group, a styryl group, and an allyl group. Examples of the cationically polymerizable group include a vinyl ether group, an epoxy group, and an oxetanyl group. Among those, the (meth)acryloyl group is preferable.

Incidentally, the (meth)acryloyl group conceptually includes both an acryloyl group and a methacryloyl group.

The number of the polymerizable groups included in the monomer X is not particularly limited, and may be one or plural (two or more).

Moreover, in a case where the monomer X includes a plurality of polymerizable groups, it corresponds to a so-called polyfunctional monomer. In the polyfunctional monomer, the number of the polymerizable groups is not particularly limited, but is preferably 2 to 4. It is preferable to use such a polyfunctional monomer, from the viewpoints that a crosslinked structure can be formed, the strength of the functional layer can be improved, and UV curing can improve the productivity quickly, for example.

Among those, the monomer X preferably has one polymerizable group, and more preferably has one (meth)acryloyl group. That is, the monomer X is a so-called monofunctional (meth)acrylate. In such an aspect, it is difficult to cause polymerization shrinkage (since there is less polymerization shrinkage), which is preferable from the viewpoints that there is small deformation of a film due to volume shrinkage.

Furthermore, the monomer X may be used singly or in combination of plural kinds thereof. Further, in a case of using the plural kinds, a total amount thereof may be any amount as long as it falls in a range of 50% by mass or more.

Specific examples of the monomer X include the monofunctional (meth)acrylates as described above, for example, acrylic acids and methacrylic acids, and derivatives thereof, and more specifically, monomers having one polymerizable unsaturated bond of a (meth)acrylic acid ((meth)acryloyl group) in the molecule. Specific examples thereof include the following compounds, but the present invention is not limited thereto.

Examples thereof include alkyl (meth)acrylates with an alkyl group having 2 to 30 carbon atoms, such as n-butyl (meth)acrylate, isobutyl (meth)acrylate, 2-ethylhexyl (meth)acrylate, isononyl (meth)acrylate, n-octyl (meth)acrylate, lauryl (meth)acrylate, and stearyl (meth)acrylate; arylalkyl (meth)acrylates with an arylalkyl group having 7 to 20 carbon atoms, such as benzyl (meth)acrylate; alkoxyalkyl (meth)acrylates with an alkoxyalkyl group having 2 to 30 carbon atoms, such as butoxyethyl (meth)acrylate; aminoalkyl (meth)acrylate with a (mono-alkyl or di-alkyl) aminoalkyl group having 1 to 20 carbon atoms in total, such as N,N-dimethylaminoethyl (meth)acrylate; (meth)acrylates of a polyalkylene glycol alkyl ether with an alkylene chain having 1 to 10 carbon atoms and a terminal alkyl ether having 1 to 10 carbon atoms, such as (meth)acrylate of diethylene glycol ethyl ether, (meth)acrylate of triethylene glycol butyl ether, (meth)acrylate of tetraethylene glycol monomethyl ether, (meth)acrylate of hexaethylene glycol monomethyl ether, monomethyl ether (meth)acrylate of octaethylene glycol, monomethyl ether (meth)acrylate of nonaethylene glycol, monomethyl ether (meth)acrylate of dipropylene glycol, monomethyl ether (meth)acrylate of heptapropylene glycol, and monoethyl ether (meth)acrylate of tetraethylene glycol; (meth)acrylates of polyalkylene glycol aryl ether with an alkylene chain having 1 to 30 carbon atoms and a terminal aryl ether having 6 to 20 carbon atoms, such as (meth)acrylate of hexaethylene glycol phenyl ether; (meth)acrylate having 4 to 30 carbon atoms in total, having an alicyclic structure, such as cyclohexyl (meth)acrylate, dicyclopentanyl (meth)acrylate, isobornyl (meth)acrylate, and methylene oxide adduct cyclodecatriene (meth)acrylate; fluorinated alkyl (meth)acrylates having 4 to 30 carbon atoms in total, such as heptadecafluorodecyl (meth)acrylate; (meth)acrylates having a hydroxyl group, such as 2-hydroxyethyl (meth)acrylate, 3-hydroxypropyl (meth)acrylate, 4-hydroxybutyl (meth)acrylate, triethylene glycol mono (meth)acrylate, tetraethylene glycol mono(meth)acrylate, hexaethylene glycol mono(meth)acrylate, octapropylene glycol mono(meth)acrylate, and mono- or di-(meth)acrylate of glycerol; (meth)acrylates having a glycidyl group such as glycidyl (meth)acrylate; polyethylene glycol mono(meth) acrylates with an alkylene chain having 1 to 30 carbon atoms such as tetraethylene glycol mono(meth)acrylate, hexaethylene glycol mono(meth)acrylate, and octapropylene glycol mono(meth)acrylate; and (meth)acrylamides such as (meth) acrylamide, N,N-dimethyl (meth)acrylamide, N-isopropyl (meth)acrylamide, 2-hydroxyethyl (meth)acrylamide, and acryloylmorpholine.

Among those, monofunctional (meth)acrylates with a long-chain alkyl group having 4 to 30 carbon atoms are preferable. Specifically, butyl (meth)acrylate, octyl (meth) acrylate, lauryl (meth)acrylate, oleyl (meth)acrylate, stearyl (meth)acrylate, behenyl (meth)acrylate, butyl (meth)acrylamide, octyl (meth)acrylamide, lauryl (meth)acrylamide, oleyl (meth)acrylamide, stearyl (meth)acrylamide, behenyl (meth)acrylamide, and the like are preferable. Among these, lauryl (meth)acrylate, oleyl (meth)acrylate, and stearyl (meth)acrylate are particularly preferable.

Examples of the monomer X include polyfunctional monomers as described above, for example, bi- to tetrafunctional (meth)acrylates, and one or more compounds selected from the group consisting of monomers having 2 to 4 functional groups selected from the group consisting of an epoxy group and an oxetanyl group.

Among die bi- to tetrafunctional (meth)acrylate monomers, preferred examples of the bifunctional (meth)acrylate monomers include neopentyl glycol di(meth)acrylate, 1,9-nonanediol di(meth)acrylate, tripropylene glycol di(meth) acrylate, ethylene glycol di(meth)acrylate, tetraethylene glycol di(meth)acrylate, hydroxylpivalic acid neopentyl glycol di(meth)acrylate, polyethylene glycol di(meth)acrylate, dicyclopentenyl (meth)acrylate, dicyclopentenyloxyethyl (meth)acrylate, and dicyclopentenyl di(meth)acrylate.

Furthermore, among the bi- to tetrafunctional (meth) acrylate monomers, preferred examples of the trifunctional or higher (meth)acrylate monomers include ECH-modified glycerol tri(meth)acrylate, EO-modified glycerol tri(meth) acrylate, PO-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth) acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate, dipentaerythritolhydroxy penta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritolethoxy tetra(meth)acrylate, pentaerythritol tetra(meth)acrylate, trimethylolpropane trimethacrylate, and tricyclodecanedimethanol diacrylate.

As an example of the monomers having 2 to 4 functional groups selected from the group consisting of an epoxy group and an oxetanyl group, aliphatic cyclic epoxy compounds, bisphenol A diglycidyl ethers, bisphenol F diglycidyl ethers, bisphenol S diglycidyl ethers, brominated bisphenol A diglycidyl ethers, brominated bisphenol F diglycidyl ethers, brominated bisphenol S diglycidyl ethers, hydrogenated bisphenol A diglycidyl ethers, hydrogenated bisphenol F diglycidyl ethers, hydrogenated bisphenol S diglycidyl ethers, 1,4-butanediol diglycidyl ethers, 1,6-hexanediol diglycidyl ethers, glycerin triglycidyl ethers, trimethylolpropane triglycidyl ethers, polyethylene glycol diglycidyl ethers, and polypropylene glycol diglycidyl ethers; polyglycidyl ethers of polyether polyol, obtained by adding one kind or two or more kinds of alkylene oxides to an aliphatic polyhydric alcohol, such as ethylene glycol, propylene glycol, and glycerin; diglycidyl esters of aliphatic long-chain dibasic acids; glycidyl esters of higher fatty acids; compounds including epoxycycloalkane; and the like are suitably used in the present invention.

Examples of commercially available products which can be suitably used as a monomer having 2 to 4 functional groups selected from the group consisting of an epoxy group and an oxetanyl group include CELLOXIDE 2021 P and CELLOXIDE 8000 manufactured by Daicel Corporation, and 4-Vinylcyclohexene Dioxide manufactured by Sigma Aldrich.

Moreover, the Log P value of the monomer X is preferably 3.0 or less, more preferably 2.5 or less, and particularly preferably 2.0 or less. The Log P value is preferably 0.5 or more, and may also be less than 0.5. When the Log P value is 0.5 or more, there is a tendency that it becomes easier for the quantum dots to be dispersed in a polymerizable composition including a first polymerizable compound, which is thus preferable.

The Log P value is an index of hydrophilicity, and the smaller value indicates that the polarity is higher. Meanwhile, oxygen is a non-polar molecule. Since a compound having a Log P value of 3.0 or less has higher polarity than oxygen, it is considered that a functional layer formed of monomers including a large amount of such the compound is insufficient in compatibility with oxygen, and thus oxygen is difficult to penetrated thereinto.

In the present invention, the Log P value refers to a logarithmic value of the partition coefficient of I-octanol/water. The Log P value can be calculated by calculation using a fragment method, an atomic approach method, or the like. Log P values described in the present specification is a Log P value calculated using ChemBioDraw Ultra 12.0 manufactured by Cambridge Soft Corporation, from the structure of the compound.

The monomer is a component (a so-called monomer) which forms a raw material for the binder, in which the component contains a polymerizable group.

The monomer is not particularly limited in the kind as long as it contains a predetermined amount of the abovementioned monomers X, and examples thereof may also include monomers Y (that is, monomers having a molecular weight of less than 100 and monomers having a molecular weight of more than 1,500) other than the monomers X. More specifically, examples of the monomers include a monofunctional monomer containing one polymerizable group, and a polyfunctional monomer containing a plurality of (preferably 2 to 4) polymerizable groups (preferably (meth)acryloyl groups).

The kind of the polymerizable group in each monomer of the monomers is not particularly limited, and examples thereof include the polymerizable groups of the monomers X as described above, with the (meth)acryloyl group being preferable.

The boiling point of the monomer is not particularly limited, but is preferably in a range of the boiling points of the monomers X as described above.

The thermogravimetric reduction rate of the monomer is not particularly limited, but is preferably in a range of the thermogravimetric reduction rates of the monomers X as described above.

Furthermore, the total amount of the resin which forms a binder in the functional layer is not particularly limited, but is preferably 90% to 99.9% by mass, and more preferably 92% to 99% by mass, with respect to 100% by mass of the total amount of the functional layer. That is, the ratio of the functional material to the total amount of the functional layer is preferably more than 0.1% and less than 10% by mass.

The thickness of the functional layer is not particularly limited, but is preferably 5 μm to 200 μm, and more preferably 10 μm to 150 μm, from the viewpoints of the dispersibility, the handleability, the light emitting properties and the like of the functional materials.

A method for forming the functional layer 12 is not particularly limited, and the functional layer 12 may also be formed by a known method. For example, in a case of a quantum dot layer, a coating composition obtained by mixing quantum dots and monomers is first prepared, and then this coating composition is coated on one of gas barrier films 14 to form a coating film, on which the other of the gas barrier films 14 is laminated. Thereafter, the coating film can be cured by UV irradiation or the like to form a functional layer 12.

In addition, a polymerization initiator, an organic metal coupling agent, a viscosity adjusting agent, a solvent, or the like may also be added to the coating composition which is to be used for a functional layer, if desired.

With regard to the polymerization initiator, reference can be made to, for example, paragraph [0037] of JP2013-043382A, and paragraphs [0040] to [0042] of JP2011-159924A. The amount of the polymerization initiator is preferably 0.1% by mole or more, and more preferably 0.5% to 5% by mole or more, with respect to the total amount of the polymerizable compound included in the coating composition. Further, in a case where the polymerization initiator includes a volatile solvent, the amount of the polymerization initiator to be included while excluding the solvent is preferably 0.1 to 10 parts by mass, more preferably 0.2 to 8 parts by mass, and still preferably 0.2 to 5 parts by mass, with respect to 100 parts by mass of the total amount of the polymerizable compound.

Moreover, the kind and the addition amount of the solvent are not particularly limited. For example, as the solvent, organic solvents can be used singly or as a mixture of two or more kinds thereof. Further, it is preferable to use a hydrophobic solvent, and it is more preferable not to use a solvent, from the viewpoint of protecting the functional material from water or oxygen.

In addition, as the organic metal coupling agent, known organic metal coupling agents can be appropriately used, depending on the materials of the layer to be adhered. Various coupling agents such as a silane coupling agent, a titanium coupling agent, a zirconium coupling agent, an aluminum coupling agent, and a tin coupling agent, for example, can be used. These organic metal coupling agents have a remarkable effect of improving the adherence, particularly in a case of using a metal, a metal oxide, a metal nitride itself, or a substrate including this material in a resin.

Examples of commercial products of the silane coupling agent which can be suitably used include those manufactured by Shin-Etsu Chemical Co., Ltd. Examples thereof include KBM-502, KBM-503, KBM-5103, KBE-502, KBE-503, KBM-903, and KBM-9103 manufactured by Shin-Etsu Chemical Co., Ltd.

Incidentally, examples of the silane coupling agent include the silane coupling agent represented by General Formula (1) described in JP2013-043382A. For the details, reference can be made to Further, for the coating liquid can include a known polymerization initiator as a polymerization initiator. With respect to the descriptions in paragraphs [0011] to [0016] of JP2013-043382A.

As the viscosity adjusting agent, a filler having a particle diameter of 5 nm to 300 nm is preferable. Further, it is also preferable that the viscosity adjusting agent is a thixotropic agent. Incidentally, in the present invention, the thixotropicity refers to a property of reducing viscosity with an increase in a shear speed in a liquid-phase composition, and the thixotropic agent refers to a material having a function of imparting the thixotropicity to the liquid-phase composition when the thixotropic agent is incorporated into the liquid-phase composition. Specific examples of the thixotropic agent include fumed silica, alumina, silicon nitride, titanium dioxide, calcium carbonate, zinc oxide, talc, mica, feldspar, kaolinite (kaolin clay), pyrophyllite (pyrophyllite clay), sericite (sericite), bentonite, smectite, vermiculite (montmorillonite, beidellite, non-tronite, saponite, and the like), organic bentonite, and organic smectite.

The gas barrier film 14 is a film having gas barrier properties, which is laminated on the main surface of the functional layer 12. That is, the gas barrier film 14 is a member that covers the main surface of the functional layer 12 to suppress the intrusion of moisture or oxygen from the main surface of the functional layer 12.

The gas barrier film 14 in the present invention has a water vapor permeability of 0.005 $[g/(m^2 \cdot day)]$ to 0.8 $[g/(m^2 \cdot day)]$.

As described above, the functional layer formed by dispersing functional materials in a binder has been sandwiched between gas barrier films for protection from the external water or oxygen in the related art. However, there present inventors have found that when the barrier performance of the gas barrier film is too high, in a case the materials of the binder in the functional layer evaporate by heat or the like during the production or use, these evaporating materials cannot be discharged, and as a result, bubbles are generated in the functional layer in some cases.

In contrast, according to the present invention, when the water vapor permeability of the gas barrier film 14 is 0.005 $[g/(m^2 \cdot day)]$ to 0.8 $[g/(m^2 \cdot day)]$, it is possible to protect the functional layer from external water or oxygen while discharging the evaporating materials of the materials of the binder in the functional layer to the outside.

From the viewpoints, the water vapor permeability of the gas barrier film 14 is preferably 0.01 [g/(m$^2$·day)] to 0.5 [g/(m$^2$·day)], and more preferably 0.02 [g/(m$^2$·day)] to 0.1 [g/(m$^2$·day)].

Incidentally, the water vapor permeability was measured under the conditions of a temperature of 40° C. and a humidity of 90% RH by a Mocon method, using PERMATRA-W3/33 manufactured by Mocon Inc.

Moreover, the oxygen permeability of the gas barrier film 14 is preferably 0.05 [cc/(m$^2$·day·atm)] to 8 [cc/(m$^2$·day·atm)], more preferably 0.1 [cc/(m$^2$·day·atm)] to 5 [cc/(m$^2$·day·atm)], and particularly preferably 0.2 [cc/(m$^2$·day·atm)] to 1 [cc/(m$^2$·day·atm)].

Incidentally, the oxygen permeability was measured under the conditions of a temperature of 23° C. and a humidity of 0% RH, using OX-TRAN2/21 manufactured by MOCON Inc.

Furthermore, the thickness of the gas barrier film 14 is preferably 5 μm to 100 μm, more preferably 10 μm to 70 μm, and particularly preferably 15 μm to 55 μm.

It is preferable to set the thickness of the gas barrier film 14 to 100 μm or less from the viewpoints that sufficient flexibility can be obtained and the thickness of the entire functional laminated film 10 can be reduced.

It is also preferable to set the thickness of the gas barrier film 14 to 5 μm or more from the viewpoints that the functional layer 12 can be appropriately supported and the thickness of the functional layer 12 can be uniform.

Here, as the gas barrier film 14, one having a gas barrier support 20 and a gas barrier layer 26 is suitably used.

In the example shown in FIG. 1A, the gas barrier film 14 has a smooth layer 24 laminated on the gas barrier support 20, and a gas barrier layer 26 laminated on the smooth layer 24.

Figure 1B:
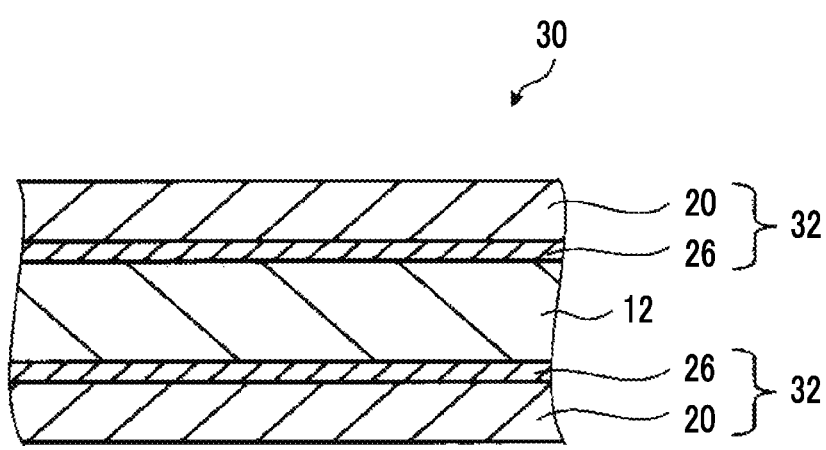
FIG. 1B is a cross-sectional view that conceptually shows another example of the functional laminated film of the present invention.

Furthermore, the gas barrier film 14 is not limited to a configuration in which the smooth layer 24 and the gas barrier layer 26 are laminated on the gas barrier support 20, and for example, a configuration in which the gas barrier layer 26 is directly laminated on the gas barrier support 20, as in a gas barrier film 32 of a functional laminated film 30 shown in FIG. 1B is also available. Alternatively, a configuration having two or more combinations of the gas barrier layer 26 with the smooth layer 24 which forms a base of the gas barrier layer 26 is also available.

Moreover, the example shown in FIG. 1A has a configuration in which the outermost layer on the side on which the functional layer 12 in the gas barrier film 14 is laminated is a gas barrier layer 26, but the present invention is not limited thereto. The present invention may have a configuration in which an organic layer such as a protective layer is laminated on the outermost layer, or a configuration in which the functional layer is laminated on the gas barrier support is also available. However, in the gas barrier film 14, it is preferable that the outermost surface is a gas barrier layer 26.

By using the outermost surface of the gas barrier film 14 as the gas barrier layer 26, even when an out gas is discharged from the gas barrier support 20 or the smooth layer 24, this out gas is shielded with the gas barrier layer 26, and thus, can be prevented from reaching the functional layer 12. Further, in a case where the layer adjacent to the functional layer 12 is an organic layer or a gas barrier support, there is a concern of intrusion of water or oxygen from the cross-section of the organic layer or the gas barrier support, and as a result, the outermost surface adjacent to the functional layer is preferably used as the gas barrier layer 26.

As the gas barrier support 20 of the gas barrier film 14, a variety of those that are used as a support in known gas barrier films can be used.

Among these, films formed of various plastics (polymer materials/resin materials) are suitably used from the viewpoint that they have transparency, can be easily made thinner and lighter, and are appropriate for making the films more flexible.

Specifically, suitable examples of the films include plastic films of polyethylene (PE), polyethylene naphthalate (PEN), polyamide (PA), polyethylene terephthalate (PET), polyvinyl chloride (PVC), polyvinyl alcohol (PVA), polyacrylonitrile (PAN), polyimide (PI), transparent polyimide, a polymethacrylic acid methyl resin (PMMA), polycarbonate (PC), polyacrylate, polymethacrylate, polypropylene (PP), polystyrene (PS), ABS, a cyclic olefin-copolymer (COC), a cycloolefin polymer (COP), and triacetyl cellulose (TAC).

Moreover, it is preferable that the gas barrier support 20 has high ultraviolet ray permeability. As a method for forming the functional layer 12 such as a quantum dot layer, a method in which a coating composition which forms the functional layer 12 is applied on the first layer of the gas barrier films 14, and further, the second layer of the gas barrier films 14 is laminated on the coating film, and then ultraviolet rays are irradiated to cure the coating film, thereby forming the functional layer 12. Accordingly, it is preferable that ultraviolet rays with which the functional layer 12 is irradiated are sufficiently permeated into the gas barrier support 20.

The thickness of the gas barrier support 20 may be appropriately set depending on the applications or the sizes. Here, as confirmed by the investigations conducted by the present inventors, the thickness of the gas barrier support 20 is preferably approximately 5 μm to 100 μm. By setting the thickness of the gas barrier support 20 to this range, results that are preferable from the viewpoints of lighter, thinner, and more flexible films are obtained.

Incidentally, for the gas barrier support 20, the surface of such a plastic film may be provided with functions such as anti-reflection, control of phase difference, improvement of light extraction efficiency, light diffusion, anti-Newton ring, and easy adhesion.

The smooth layer 24 forms a base layer of the gas barrier layer 26 that usually exhibits gas barrier properties in the gas barrier film 14.

As the smooth layer 24, a variety of those that are used as a smooth layer in known gas barrier films can be used. For example, the smooth layer 24 is a film having an organic compound as a main component, and basically, those formed by the crosslinking of monomers and/or oligomers can be used.

In addition, the film having an organic compound as a main component is a film containing 50% or more of an organic compound.

When the gas barrier film 14 has the smooth layer 24 which forms a base, this smooth layer 24 also actions as a cushion of the gas barrier layer 26. As a result, for example, at a time when the gas barrier film 14 is laminated on the functional layer 12, in a case where the gas barrier layer 26 is subjected to external impact, the damage of the gas barrier layer 26 can be prevented by the cushioning effect of the smooth layer 24.

As a result, in the functional laminated film 10, the gas barrier film 14 appropriately exhibits gas barrier performance, and thus, the functional layer 12 can be suitably prevented from being deteriorated by moisture or oxygen.

Furthermore, when the gas barrier film 14 has the smooth layer 24 which forms a base of the gas barrier layer 26, the unevenness of the surface of the gas barrier support 20, and foreign materials and the like attached to the surface are embedded, whereby the gas barrier layer 26 can be appropriately formed. As a result, it is possible to form a proper gas barrier layer 26 free of cracks, fissures, and the like. Thus, an appropriate gas barrier film 14 having gas barrier performance having a water vapor permeability of 0.005 [$g/(m^2 \cdot day)$] to 0.8 [$g/(m^2 \cdot day)$] can be easily obtained.

For the gas barrier film 14, as a material for forming the smooth layer 24, various organic compounds (resins/polymer compounds) can be used.

Specifically, films of thermoplastic resins such as polyesters, acrylic resins, methacrylic resins, a methacrylic acid-maleic acid copolymer, polystyrene, transparent fluororesins, polyimides, fluorinated polyimides, polyamides, polyamideimides, polyetherimides, cellulose acylates, polyurethane, polyether ether ketone, polycarbonates, alicyclic polyolefins, polyarylates, polyether sulfone, polysulfone, fluorene ring-modified polycarbonates, alicyclic modified polycarbonates, fluorene ring-modified polyesters, and acryloyl compounds; polysiloxane; or other organosilicon compounds are suitably exemplified. These may be used in combination of plural kinds thereof.

Among those, from the viewpoints of excellent glass transition temperatures and intesities, and the like, the smooth layer 24 composed of polymerized products of cationically polymerizable compounds having radically polymerizable compounds and/or ether groups in the functional groups is suitable.

Among those, in particular, from the viewpoints of a low refractive index, high transparency, and excellent optical characteristics, acrylic resins and methacrylic resins having a glass transition temperature of 120° C. or higher, which has a polymer of acrylate and/or methacrylate monomers or oligomers as a main component, are suitably exemplified for the smooth layer 24.

Among those, in particular, acrylic resins or methacrylic resins having a polymer of bifunctional or higher, particularly trifunctional or higher acrylate and/or methacrylate monomers or oligomers as a main component, such as dipropylene glycol di(meth)acrylate (DPGDA), trimethylolpropane tri(meth)acrylate (TMPTA), and dipentaerythritol hexa(meth)acrylate (DPHA) are suitably exemplified. Incidentally, these acrylic resins or methacrylic resins may also be preferably used in plural kinds thereof.

Since the gas barrier layer 26 can be formed on a base having a firm skeleton by forming the smooth layer 24 from such acrylic resins or methacrylic resins, it is possible to form the gas barrier layer 26 which is denser and has higher gas barrier properties.

The thickness of the smooth layer 24 is preferably 0.5 μm to 5 μm.

By setting the thickness of the smooth layer 24 to 0.5 μm or more, it is possible to more reliably prevent the damage of the gas barrier layer 26 by sufficiently exerting the effect as a cushion, for example, at a pressing time for adhering the gas barrier film 14 to the functional layer 12. Further, by setting the thickness of the smooth layer 24 to 1 μm or more, it is possible to form an appropriate gas barrier layer 26 free of cracks, fissures, and the like by more suitably adjusting the surface on which the gas barrier layer 26 is formed to be more appropriate.

In addition, by setting the thickness of the smooth layer 24 to 5 μm or less, it is possible to suitably prevent the occurrence of problems such as cracks of the smooth layer 24 and curls of the gas barrier film 14, caused by a too high thickness of the smooth layer 24.

Taking into consideration the above viewpoints, the thickness of the smooth layer 24 is more preferably set to 1 μm to 5 μm.

Moreover, in a case where the gas barrier film has a plurality of smooth layers, the thickness of the respective smooth layers may be the same or different from each other.

Incidentally, in a case where a plurality of the smooth layers are included, the materials that form the respective smooth layers may be the same or different from each other. However, from the viewpoints of productivity and the like, it is preferable that all the smooth layers are formed of the same materials.

The smooth layer 24 may be formed by a known method such as a coating method and flash deposition.

Furthermore, in a case of including a plurality of combinations of the smooth layer 24 and the gas barrier layer 26, the smooth layer 24 formed on the gas barrier layer 26 preferably contains a silane coupling agent in order to improve the adhesiveness of the underlayer to the gas barrier layer 26.

On the smooth layer 24, the gas barrier layer 26 is formed, using the smooth layer 24 as a base.

The gas barrier layer 26 mainly exhibits gas barrier properties in the gas barrier film 14.

The gas barrier layer 26 is not particularly limited as long as it can adjust the gas barrier performance of the gas barrier film 14 to 0.005 [$g/(m^2 \cdot day)$] to 0.8 [$g/(m^2 \cdot day)$], and a film having an inorganic compound as a main component is suitably used.

As the material for forming the inorganic compound which forms the gas barrier layer 26, a variety of films formed of inorganic compounds such as oxides, nitrides, and oxynitrides, which express gas barrier properties can be used.

Specifically, films formed of inorganic compounds, for example, metal oxides such as aluminum oxide, magnesium oxide, tantalum oxide, zirconium oxide, titanium oxide, and indium tin oxide (ITO); metal nitrides such as aluminum nitride; metal carbides such as aluminum carbide; silicon oxides such as silicon oxide, silicon oxynitride, silicon oxycarbide, and silicon oxynitride carbide; silicon nitrides such as silicon nitride and silicon nitride carbide; silicon carbides such as silicon carbide; hydrides thereof; mixtures of two or more kinds thereof; and hydrogen-containing materials thereof are suitably exemplified.

In particular, films formed of silicon compounds such as silicon oxide, silicon nitrides, silicon oxynitrides, and silicon oxide, and films formed of aluminum oxide are suitably exemplified from the viewpoints that they can exhibit high transparency and excellent gas barrier properties. Among these, films formed of any one of silicon nitride, silicon oxide, and aluminum oxide are suitably exemplified since they have high transparency, in addition to more excellent gas barrier properties.

Furthermore, in a case where the gas barrier film has a plurality of gas barrier layers, the materials that form the gas barrier layer may be different from each other. However, taking into consideration the productivity and the like, it is preferable that all the gas barrier layers are formed of the same materials.

As the thickness of the gas barrier layer 26, a thickness with which desired gas barrier properties can be exhibited may be appropriately determined, depending on the materials that form the layer. Further, according to the investigations conducted by the present inventors, in a case of forming the gas barrier layer 26 from the above-described inorganic compounds, the thickness of the gas barrier layer 26 is preferably set to 10 to 200 nm.

By setting the thickness of the gas barrier layer 26 to 10 nm or more, it is possible to form the gas barrier layer 26 which stably expresses sufficient gas barrier performance. Incidentally, the gas barrier layer 26 formed of inorganic materials is generally brittle, and if it is too thick, cracks or fissures, peeling-off, or the like can occur easily, but by setting the thickness of the gas barrier layer 26 to 200 nm or less, flexibility can be improved by preventing the generation of cracks.

Furthermore, taking into consideration such points, the thickness of the gas barrier layer 26 formed of an inorganic material is preferably 10 nm to 100 nm, and particularly preferably 12 nm to 75 nm.

In addition, in the case where the gas barrier film has a plurality of gas barrier layers, the thickness of the respective gas barrier layers may be the same or different from each other.

The gas barrier layer 26 may be formed by a known method, depending on the materials for forming the layer. Specifically, in the case of the gas barrier layer 26 formed of inorganic materials, plasma CVDs such as CCP-CVD and ICP-CVD, sputtering such as magnetron sputtering and reactive sputtering, and vacuum deposition methods such as vapor deposition are suitably exemplified.

Here, the functional laminated film 10 shown in FIG. 1A has a configuration where three layers of the gas barrier film 14, the functional layer 12, and the gas barrier film 14 are laminated but the present invention is not limited thereto, and other layers may also be included. For example, a hard coat layer, an optical compensation layer, a transparent conductive layer, or the like may also be included.

Moreover, the functional laminated film 10 preferably has a water vapor permeability of 0.0025 [$g/(m^2 \cdot day)$] to 0.4 [$g/(m^2 \cdot day)$].

That is, by setting the water vapor permeability to the range in the state where the functional layer 12 and two gas barrier films 14 are laminated, more suitably, it is possible to protect the functional layer from external water or oxygen while discharging the evaporating binder materials to the outside of the gas barrier film.

Hereinabove, the functional laminated film of the present invention is described in detail, but the present invention is not limited to the embodiments. Further, various modifications or alterations may also been made within a range not departing from the gist of the present invention.

EXAMPLES

Hereinbelow, the present invention will be described in more detail with reference to specific Examples of the present invention.

Example 1

In Example 1, the functional laminated film 30 shown in FIG. 1B was manufactured.

<Gas Barrier Film>

As the gas barrier film 32, a gas barrier film in which the gas barrier layer 26 was formed on the gas barrier support 20 was used.

As the gas barrier support 20, a polyethylene terephthalate film (PET film, COSMOSHINE A4300 manufactured by Toyobo Co., Ltd.) having a thickness of 50 μm, a width of 1,000 mm, and a length of 100 m was used.

A silicon nitride film was formed as the gas barrier layer 26 on the surface of the gas barrier support 20 by means of Capacitive Coupled Plasma (CCP)-CVD, using a common roll-to-roll (hereinafter also referred to as "R-to-R"), thereby manufacturing a gas barrier film 32.

As a raw material gas, a silane gas ($SiH_4$), an ammonia gas ($NH_3$), a nitrogen gas ($N_2$), and a hydrogen gas ($H_2$) were used. With regard to the amounts of the gases to be applied, the amount of the silane gas was 160 sccm, the amount of the ammonia gas was 370 sccm, the amount of the nitrogen gas was 240 sccm, and the amount of the hydrogen gas was 590 sccm. Further, the film formation pressure was set to 40 Pa. The power for plasma excitation was 2.5 kW at a frequency of 13.56 MHz.

The film thickness of the silicon nitride film was set to 50 nm.

The water vapor permeability of the manufactured gas barrier film 32 was measured by a Mocon method, using PERMATRAN manufactured by Mocon Inc. The water vapor permeability under the conditions of a temperature of 40° C. and a humidity of 90% RH was 0.01 [$g/(m^2 \cdot day)$].

<Functional Layer>

Next, the coating composition which forms the functional layer 12 was coated on the gas barrier layer 26 of the gas barrier film 32 by an R-to-R coating apparatus.

As the coating composition of the functional layer 12, the following respective components were mixed to prepare a quantum dot-containing polymerizable composition A, which was filtered through a polypropylene-made filter having a pore diameter of 0.2 μm, and then dried under reduced pressure for 30 minutes, and the resultant was used as a coating liquid. Further, the concentration of the quantum dots in the following toluene dispersion liquid was 1% by mass.

Furthermore, the molecular weights of cyclohexyl acrylate and trimethylolpropane triacrylate, which are monomers forming the binder of the functional layer 12, are 154.2 and 296.3, respectively. That is, cyclohexyl acrylate and trimethylolpropane triacrylate are the monomers X in the present invention, and the proportion of the monomers X in all the monomers is 100% by mass.

Furthermore, the boiling point and the thermogravimetric reduction rate of cyclohexyl acrylate are 182° C. to 184° C., and 0.9% by mass, respectively, and the boiling point and the thermogravimetric reduction rate of trimethylolpropane triacrylate are 315.5° C. and 0.4% by mass, respectively.

(Quantum Dot-Containing Polymerizable Composition A)

| | |
|---|---|
| Toluene dispersion liquid of quantum dots 1 (light emission maximum: 520 nm) | 10 parts by mass |
| Toluene dispersion liquid of quantum dots 2 (light emission maximum: 630 nm) | 1 part by mass |
| Cyclohexyl acrylate | 80.8 parts by mass |
| Trimethylolpropane triacrylate | 18.2 parts by mass |
| Photopolymerization initiator: IRGACURE 819 (manufactured by BASF) | 1 part by mass |

While continuously transporting the gas barrier film 32 at a speed of 1 m/min and a tension of 60 N/m by an R-to-R coating apparatus, the coating composition prepared above was coated on the gas barrier layer 26 by a die coater to form a coating film having a thickness of 50 μm.

Then, the film having the coating film formed thereon was wound on a backup roller, and the other gas barrier film 32 was laminated on the coating film in the direction in which the gas barrier layer 26 was in contact with the coating film.

Further, while continuously transporting the film in a state where the coating film was sandwiched between the two gas barrier films 32, the film was passed through a heating zone at 60° C. for 3 minutes. Thereafter, irradiation with ultraviolet rays using a 160 W/cm air-cooled metal halide lamp (manufactured by Eye Graphics Co., Ltd.) was performed for curing, thereby forming a functional layer 12 containing the quantum dots, and thus manufacturing a functional laminated film 30.

The irradiation dose of the ultraviolet rays was 2,000 mJ/cm$^2$.

The water vapor permeability of the functional laminated film 30 was measured by a Mocon method, using PERMATRAN manufactured by Mocon Inc., and the water vapor permeability under the conditions of a temperature of 40° C. and a humidity of 90% RH was 0.006 [g/(m$^2$·day)].

Example 2

In the same manner as in Example 1 except that the gas barrier film 14 having the smooth layer 24 between the gas barrier support 20 and the gas barrier layer 26 was used instead of the gas barrier film 32, a functional laminated film 10 was manufactured. That is, the functional laminated film 10 shown in FIG. 1A was manufactured.

The gas barrier film 14 was the same as the gas barrier film 32 in Example 1 except that the smooth layer 24 was formed on the gas barrier support 20, and then the gas barrier layer 26 was formed on the smooth layer 24 in the same manner as Example 1.

The water vapor permeability of the gas barrier film 14 was 0.007 [g/(m$^2$·day)].

In addition, the water vapor permeability of the functional laminated film 10 was 0.003 [g/(m$^2$·day)].

Moreover, the smooth layer 24 was formed as a film having a thickness of 1 μm by applying the following coating solution on the gas barrier support 20 by a coating method, and then dried and irradiated with ultraviolet rays to perform polymerization.

As a coating liquid for forming the smooth layer 24, a coating liquid having a concentration of the solid content of 15% was prepared by weighing a TMPTA polymerizable compound (manufactured by Daicel-Cytec Co., Ltd.) and a ultraviolet-rays polymerization initiator (manufactured by LAMBERTI S.p.A., ESACURE KTO46) to a mass ratio of 95:5, and dissolving them in methyl ethyl ketone.

While transporting the prepared coating liquid to the R-to-R apparatus using a die coater, the coating liquid was applied onto the gas barrier support 20, passed through a drying zone at 50° C. for 3 minutes, and then irradiated with ultraviolet rays (integrated irradiation dose of about 600 mJ/cm$^2$) to perform UV curing, thereby forming a smooth layer 24.

Example 3

In the same manner as in Example 1 except that an aluminum oxide film was used instead of the silicon nitride film as the gas barrier layer 26 of the gas barrier film 32, a functional laminated film 30 was manufactured.

The aluminum oxide film (alumina film) was formed by a common sputtering apparatus. Specifically, the gas barrier support 20 was charged in a common sputtering apparatus, and DC magnetron sputtering was performed, using an alumina sintered body as a target, thereby forming a gas barrier layer 26 made of an aluminum oxide film.

The water vapor permeability of the gas barrier film 32 was 0.05 [g/(m$^2$·day)].

In addition, the water vapor permeability of the functional laminated film 30 was 0.03 [g/(m$^2$·day)].

Example 4

In the same manner as in Example 1 except that a silicon oxide film was used instead of the silicon nitride film as the gas barrier layer 26 of the gas barrier film 32, a functional laminated film 30 was manufactured.

The silicon oxide film was formed by a common vacuum deposition apparatus.

The water vapor permeability of the gas barrier film 32 was 0.1 [g/(m$^2$·day)].

In addition, the water vapor permeability of the functional laminated film 30 was 0.06 [g/(m$^2$·day)].

Example 5

In the same manner as in Example 4 except that the thickness of the silicon oxide film which was the gas barrier layer 26 was changed to 20 nm, a functional laminated film 30 was manufactured.

The water vapor permeability of the gas barrier film 32 was 0.5 [g/(m$^2$·day)].

In addition, the water vapor permeability of the functional laminated film 30 was 0.25 [g/(m$^2$·day)].

Example 6

In the same manner as in Example 1 except that the following quantum dot-containing polymerizable composition B was prepared as a coating composition of the functional layer 12, a functional laminated film 30 was manufactured.

Furthermore, the molecular weight, the boiling point, and the thermogravimetric reduction rate of lauryl methacrylate were 254.4, 272° C. to 343° C., and 0.15% by mass, respectively.

In addition, the water vapor permeability of the functional laminated film 30 was 0.005 [g/(m$^2$·day)].

(Quantum Dot-Containing Polymerizable Composition B)

| | |
|---|---|
| Quantum dots 1 (light emission maximum: 520 nm) | 10 parts by mass |
| Quantum dots 2 (light emission maximum: 630 nm) | 1 part by mass |
| Lauryl methacrylate | 80.8 parts by mass |
| Trimethylolpropane triacrylate | 18.2 parts by mass |
| Photopolymerization initiator: IRGACURE 819 (manufactured by BASF) | 1 part by mass |

Example 7

In the same manner as in Example 1 except that the following quantum dot-containing polymerizable composition C was prepared as a coating composition of the functional layer 12, a functional laminated film 30 was manufactured.

Furthermore, the molecular weight of AM90G that is a monomer which forms a base of the repeating unit of the binder was 454.

In addition, the water vapor permeability of the functional laminated film 30 was 0.005 [g/(m$^2$·day)].

(Quantum Dot-Containing Polymerizable Composition C)

| | |
|---|---|
| Quantum dots 1 (light emission maximum: 520 nm) | 10 parts by mass |
| Quantum dots 2 (light emission maximum: 630 nm) | 1 part by mass |
| AM90G (CAS32171-39-4, Shin-Nakamura Chemical Co., Ltd.) | 80.8 parts by mass |
| Trimethylolpropane triacrylate | 18.2 parts by mass |
| Photopolymerization initiator: IRGACURE 819 (manufactured by BASF) | 1 part by mass |

Example 8

In the same manner as in Example 1 except that the thickness of the gas barrier layer 26 was set to 10 nm, a functional laminated film 30 was manufactured.

The water vapor permeability of the gas barrier film 32 was 0.06 [g/(m²·day)].

In addition, the water vapor permeability of the functional laminated film 30 was 0.03 [g/(m²·day)].

Comparative Example 1

In the same manner as in Example 2 except that after forming the smooth layer and then forming the gas barrier layer, a protective film was pasted, transported, and wound in a state where the smooth layer and the gas barrier layer were protected, a gas barrier film was manufactured, and a functional laminated film was manufactured.

That is, a protective film for a smooth layer was pasted on a pass roll immediately after forming the smooth layer, transported, and wound. Further, immediately before forming the gas barrier layer, the protective film for a smooth layer was peeled off to form a gas barrier layer, and the protective film for a gas barrier layer was pasted on a film surface touch roll immediately after forming the gas barrier layer, transported, and wound to manufacture a gas barrier film.

The water vapor permeability of the gas barrier film 14 was 0.0004 [g/(m²·day)].

In addition, the water vapor permeability of the functional laminated film 30 was 0.0002 [g/(m²·day)].

Comparative Example 2

In the same manner as in Example 1 except that a gas barrier layer was not formed, a functional laminated film was manufactured. That is, a functional laminated film having a functional layer sandwiched between PET films was manufactured.

Furthermore, the water vapor permeability of the PET film was 3 [g/(m²·day)].

In addition, the water vapor permeability of the functional laminated film 30 was 1.4 [g/(m²·day)].

[Evaluation]

<Presence or Absence of Bubbles>

With regard to the manufactured functional laminated films of Examples 1 to 8 and Comparative Examples 1 and 2, the presence or absence of bubbles was evaluated.

Specifically, the number of bubbles generated per m² was visually observed and the bubbles having a size of 100 μm or more were counted.

Evaluation was carried out in the following manner, based on the number of bubbles.

A: No bubble was found.
B: The number of bubbles is 1 or more and less than 10.
C: The number of bubbles is 10 or more and less than 30.
D: The number of bubbles is 30 or more and less than 50.
E: The number of bubbles is 50 or more.

<Measurement of Luminance>

The manufactured functional laminated films of Examples 1 to 8 and Comparative Examples 1 and 2 were introduced into the following liquid crystal display device to measure a luminance.

First, a commercially available liquid crystal display device (Kindle Fire HDX 7", manufactured by Amazon) was disassembled to take out a backlight unit including a blue light source. Next, a functional laminated film which had been cut into a rectangle was placed on the light guide plate of the backlight unit, and two prism sheets taken out from the liquid crystal display device were arranged to overlap such that the directions of the concave and convex surface patterns were orthogonally crossed.

The backlighting unit was switched on and the luminance was measured by a luminance meter (SR3 manufactured by TOPCON Corporation) installed at a position 740 mm apart in a vertical direction from the front surface of the backlight unit.

Evaluation was carried out in the following manner, based on the measured luminance.

A: The luminance is 15,300 cd/m² or more.
B: The luminance is less than 15,300 cd/m² and 13,770 cd/m² or more.
C: The luminance is less than 13,770 cd/m² and 12,240 cd/m² or more.
D: The luminance is less than 12,240 cd/m² and 10,710 cd/m² or more.
E: The luminance is less than 10,710 cd/m².

The results are shown in the following Table 1.

[Table 1]

TABLE 1

| | Gas barrier film | | | Functional layer | | Functional laminated film | Evaluation | |
|---|---|---|---|---|---|---|---|---|
| | Gas barrier layer | | Water vapor | Monomer X | | Water vapor | Presence | |
| | Material | Thickness nm | permeability g/(m²·day) | Molecular weight | Proportion % by mass | permeability g/(m²·day) | or absence of bubbles | Luminance |
| Example 1 | SiN | 50 | 0.01 | 154.2/296 | 100 | 0.006 | C | C |
| Example 2 | SiN (+smooth layer) | 50 | 0.007 | 154.2/296 | 100 | 0.003 | D | D |
| Example 3 | Al₂O₃ | 50 | 0.05 | 154.2/296 | 100 | 0.03 | B | B |
| Example 4 | SiO | 50 | 0.1 | 154.2/296 | 100 | 0.06 | A | A |
| Example 5 | SiO | 20 | 0.5 | 154.2/296 | 100 | 0.25 | A | B |

TABLE 1-continued

| | Gas barrier film | | | Functional layer | | Functional laminated film | Evaluation | |
|---|---|---|---|---|---|---|---|---|
| | Gas barrier layer | | Water vapor permeability g/(m² · day) | Monomer X | | Water vapor permeability g/(m² · day) | Presence or absence of bubbles | Luminance |
| | Material | Thickness nm | | Molecular weight | Proportion % by mass | | | |
| Example 6 | SiN | 50 | 0.01 | 254.4/296 | 100 | 0.005 | B | B |
| Example 7 | SiN | 50 | 0.01 | 454/296 | 100 | 0.005 | A | A |
| Example 8 | SiN | 10 | 0.06 | 154.2/296 | 100 | 0.03 | B | B |
| Comparative Example 1 | SiN | 50 | 0.0004 | 154.2/296 | 100 | 0.0002 | E | E |
| Comparative Example 2 | — | | 3 | 154.2/296 | 100 | 1.4 | A | E |

As shown in Table 1, it can be seen that the functional laminated film of the present invention has less bubbles, higher luminance, and less deterioration of the quantum dots, as compared with Comparative Examples.

Incidentally, from the comparison of Examples 1, 6, and 7, it can be seen that as the molecular weight of the monomer (monomer X) which form the material of the binder of the functional layer is higher, generation of bubbles is reduced. The reason therefor is that as the molecular weight of the monomer is higher, evaporation is more difficult to occur.

On the other hand, from the comparison of Examples 1 to 5, and 8, it can be seen that as the water vapor permeability of the gas barrier film is higher, that is, as the gas barrier performance is low, generation of the bubbles is reduced. The reason therefor is that as the gas barrier performance of the gas barrier film is low, the evaporating binder materials can be discharged to the outside.

Here, from Examples 4 and 5, and Comparative Example 2, it can be seen that as the gas barrier performance of the gas barrier film becomes lower, generation of the bubbles is reduced, but the luminance is lowered. The reason therefor is that since as the gas barrier performance of the gas barrier film becomes lower, it becomes difficult to suppress the intrusion of water or oxygen from the outside, and thus, the deterioration of the functional layer due to water and oxygen cannot be more suitably suppressed.

From the above results, the effect of the present invention is obvious.

EXPLANATION OF REFERENCES 10, 30: functional laminated films
12: functional layer
14, 32: gas barrier films
20: gas barrier support
24: smooth layer
26: gas barrier layer

What is claimed is:

1. A functional laminated film formed by sandwiching a functional layer between gas barrier films, wherein
the gas barrier film has a gas barrier support and a gas barrier layer,
the functional layer is formed by dispersing quantum dots in a binder,
the binder is formed by the polymerization of monomers,
the monomers include 50% by mass or more of monomers X having a molecular weight of 100 to 1,500 with respect to the total mass of the monomers, and
the water vapor permeability of the gas barrier film is 0.005 [g/(m²·day)] to 0.8 [g/(m²·day)].

2. The functional laminated film according to claim 1, wherein the water vapor permeability of the functional laminated film is 0.0025 [g/(m²·day)] to 0.4 [g/(m²·day)].

3. The functional laminated film according to claim 1, wherein the boiling point of the monomer X is 160° C. to 250° C.

4. The functional laminated film according to claim 2, wherein the boiling point of the monomer X is 160° C. to 250° C.

5. The functional laminated film according to claim 1, wherein the thermogravimetric reduction rate of the monomer X is 2% by mass or less at 100° C.

6. The functional laminated film according to claim 4, wherein the thermogravimetric reduction rate of the monomer X is 2% by mass or less at 100° C.

7. The functional laminated film according to claim 1, wherein the monomer X has a (meth)acryloyl group.

8. The functional laminated film according to claim 6, wherein the monomer X has a (meth)acryloyl group.

9. The functional laminated film according to claim 7, wherein the monomer X has one (meth)acryloyl group.

10. The functional laminated film according to claim 8, wherein the monomer X has one (meth)acryloyl group.

11. The functional laminated film according to claim 1, wherein the monomers X include monomers having 2 to 4 (meth)acryloyl groups.

12. The functional laminated film according to claim 10, wherein the monomers X include monomers having 2 to 4 (meth)acryloyl groups.

13. The functional laminated film according to claim 1, wherein the binder is formed by the polymerization of monomers in the presence of a photopolymerization initiator.

14. The functional laminated film according to claim 12, wherein the binder is formed by the polymerization of monomers in the presence of a photopolymerization initiator.

15. The functional laminated film according to claim 1, wherein
the gas barrier layer is disposed to be in contact with the functional layer.

16. The functional laminated film according to claim 14, wherein
the gas barrier layer is disposed to be in contact with the functional layer.

17. The functional laminated film according to claim 1, wherein the gas barrier layer has a film formed of any one of aluminum oxide, silicon oxide, and silicon nitride.

18. The functional laminated film according to claim 16, wherein the gas barrier layer has a film formed of any one of aluminum oxide, silicon oxide, and silicon nitride.

19. The functional laminated film according to claim 1, wherein the functional layer is a light wavelength conversion layer.

20. The functional laminated film according to claim 18, wherein the functional layer is a light wavelength conversion layer.

* * * * *